(12) United States Patent
Atalla et al.

(10) Patent No.: US 11,608,385 B2
(45) Date of Patent: Mar. 21, 2023

(54) ALTERNATIVE POST TREATMENT FOR STABILIZING HIGHLY DISORDERED CELLULOSES

(71) Applicant: CELLULOSE SCIENCES INTERNATIONAL, INC., Verona, WI (US)

(72) Inventors: Rajai H. Atalla, Madison, WI (US); Rowan S. Atalla, Madison, WI (US)

(73) Assignee: CELLULOSE SCIENCES INTERNATIONAL, INC, Verona, WI (US)

( * ) Notice: Subject to any disclaimer, the term of this patent is extended or adjusted under 35 U.S.C. 154(b) by 111 days.

(21) Appl. No.: 15/337,302

(22) Filed: Oct. 28, 2016

(65) Prior Publication Data

US 2017/0121427 A1    May 4, 2017

Related U.S. Application Data

(60) Provisional application No. 62/249,102, filed on Oct. 30, 2015.

(51) Int. Cl.
| | |
|---|---|
| *C08B 1/00* | (2006.01) |
| *A23K 10/37* | (2016.01) |
| *C08L 1/02* | (2006.01) |
| *C08B 1/08* | (2006.01) |
| *A23K 10/20* | (2016.01) |
| *A23K 50/10* | (2016.01) |

(52) U.S. Cl.
CPC ............... *C08B 1/00* (2013.01); *A23K 10/20* (2016.05); *A23K 10/37* (2016.05); *A23K 50/10* (2016.05); *C08B 1/08* (2013.01); *C08L 1/02* (2013.01); *Y02P 20/582* (2015.11); *Y02P 60/87* (2015.11)

(58) Field of Classification Search
CPC ..... C08B 1/00; C08B 1/08; C08L 1/02; A23K 10/37
USPC ........................................................ 536/124
See application file for complete search history.

(56) References Cited

U.S. PATENT DOCUMENTS

| | | | |
|---|---|---|---|
| 1,754,207 | A | 4/1930 | Bradley et al. |
| 2,964,449 | A | 12/1960 | Thomsen |
| 4,138,312 | A | 2/1979 | Gill et al. |
| 4,395,543 | A | 7/1983 | Wang et al. |
| 7,670,813 | B2 | 3/2010 | Foody et al. |
| 8,617,851 | B2 | 12/2013 | Atalla |

(Continued)

OTHER PUBLICATIONS

Philipp et al., "Solid-State Carbon-13 NMR and Wide-Angle X-ray Scattering Study of Cellulose Disordering by Alkali Treatment" ACS Symposium Series; American Chemical Society: Washington, DC, 1987. pp. 178-188 https://pubs.acs.org/doi/pdf/10.1021/bk-1987-0340.ch010 (Year: 1987).*

(Continued)

*Primary Examiner* — Eric Olson
(74) *Attorney, Agent, or Firm* — Michael Best & Friedrich LLP

(57) ABSTRACT

A method is provided for the post-treatment of nanoporous celluloses with an eye to scale up to plant operation wherein recycling and recovery of reagents is crucial in the efficient and cost effective operation of a full-scale plant. The instant method includes diminishing the alkali (e.g., sodium hydroxide) concentration of the treatment solution by converting it to a salt (e.g., a sodium salt).

23 Claims, 2 Drawing Sheets

(56) References Cited

U.S. PATENT DOCUMENTS

| | | | |
|---|---|---|---|
| 2004/0020854 A1 | 2/2004 | Ali et al. | |
| 2004/0102625 A1* | 5/2004 | Schneider | C08B 11/193 536/95 |
| 2010/0184151 A1 | 7/2010 | Tolan et al. | |
| 2011/0129880 A1 | 6/2011 | Conners et al. | |
| 2011/0272109 A1 | 11/2011 | Leite | |
| 2011/0281317 A1 | 11/2011 | Arifin et al. | |
| 2013/0172544 A1 | 7/2013 | Atalla | |
| 2014/0220228 A1* | 8/2014 | Atalla | A23K 10/38 426/635 |
| 2015/0147478 A1* | 5/2015 | Shutt | C08K 5/098 427/427.7 |
| 2017/0121427 A1 | 5/2017 | Atalla | |

OTHER PUBLICATIONS

Rajai Hanna Atalla, "Nanoporous Cellulose: A previously unknown form of cellulose with properties dramatically different from those of other forms" Presented at the 243rd national meeting of the American Chemical Society (Year: 2012).*

Rajai Hanna Atalla, "Nanoporous Cellulose: A new form of cellulose with novel properties" Presented at the 249th national meeting of the American Chemical Society (Year: 2015).*

International Search Report and Written Opinion for Application No. PCT/US2016/059337 dated Jan. 3, 2017 (14 pages).

International Search Report and Written Opinion for Application No. PCT/US2018/027782 dated Jul. 3, 2018 (13 pages).

European Patent Office Extended Search Report for Application No. 16860882.6 dated May 24, 2019 (6 pages).

* cited by examiner

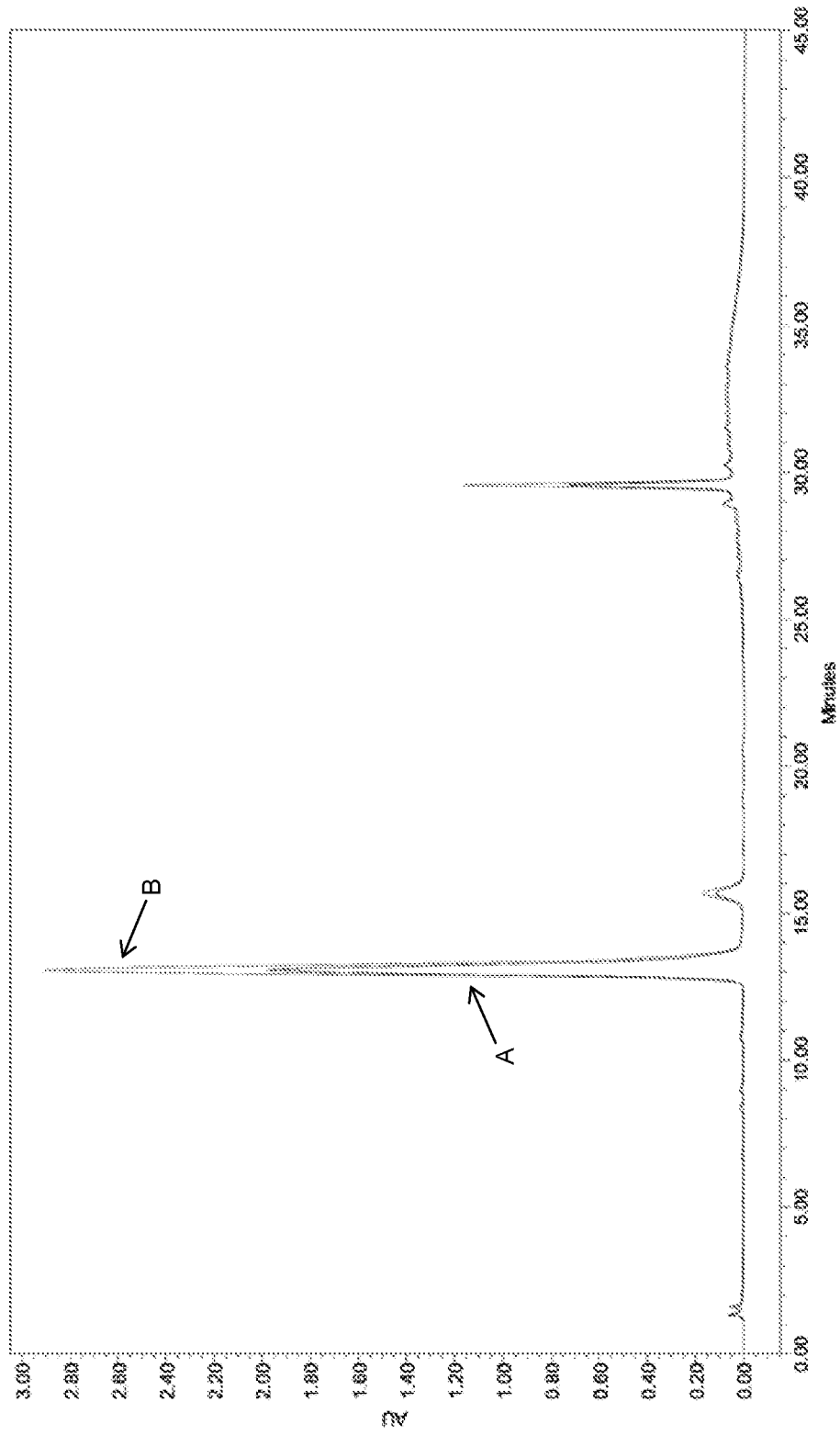
Figure 2: HPCL of corn stover extract (water solvent). Showing the presence of 3 predominant peaks that have UV spectral characteristics of hydroxycinnamic acids. Extracted chromatogram are 320 nm (B) and 280nm (A).
The numbers 280 nm and 320 nm represent the UV wavelength at which the detection was carried out.

ALTERNATIVE POST TREATMENT FOR STABILIZING HIGHLY DISORDERED CELLULOSES

Lignocellulose is a complex substrate composed of a mixture of carbohydrate polymers (namely cellulose and hemicellulose) and lignin. Cellulose, hemicellulose and lignin have been studied in the past as possible sources of raw materials for liquid fuels and chemicals.

Even though cellulose is by far the most common naturally occurring polymer, its extremely useful chains are often almost entirely locked up by lignin, hemicelluloses and, particularly, adjacent chains of cellulose. Many technical difficulties are associated with the separation of the lignocellulosic components due to the complex nature of celluloses. Nonetheless, there exist numerous methods for freeing cellulose molecules from their surroundings. The unlocking of cellulose from a lignocellulosic biomass, e.g., for producing more reactive celluloses, relies mainly on the separation of cell wall components to allow increased reactivity, e.g., hydrolysis, of the carbohydrates polymer into, e.g., fermentable sugars or other valuable chemicals. These methods are typically expensive, and generally done under severe conditions involving high temperatures, long residence times and a variety of more or less troublesome chemicals. However, because cellulose is renewable, abundant and not producing carbon dioxide by burning if photosynthesis is considered, there has been recent scientific work in attempting to more easily unlock the cellulose.

For any chemical and/or physical reaction or system for unlocking cellulose, first developed at the laboratory scale, to achieve commercial viability, the system must be scaled up to full-sized process plant. Such a scale-up process can be a quite expensive and a very time-consuming process, especially as certain aspects have to be determined again at each step of the scale up process. Such aspects include the productivity and selectivity of the reaction, the quality of the product as well as aspects related to the safety and environmental protection.

BRIEF DESCRIPTION

Recently, the first inventor has developed a method of increasing the accessibility of chains of cellulose for biochemical and chemical reaction (See, U.S. Pat. No. 8,617,851 and U.S. Published Application No. 2013/0172544, both of which are incorporated by reference herein) in which novel forms of cellulose, collectively known as highly disordered celluloses or nanoporous celluloses, are formed by treating conventional sources of cellulose (e.g., biomass such as corn stover) with an alkali in a co-solvent, which suitably includes water and a second solvent that is polar and fully water-miscible, typically a lower alcohol, such as ethanol, or a polyol, to form less ordered celluloses, or laterally expanded celluloses or nanoporous celluloses, and stabilizing these nanoporous celluloses so that the alkali does not facilitate conversion to cellulose II. The process opens up the tightly aggregated domains, making the celluloses more accessible for enzymatic or chemical reaction. For convenience, this prior invention is, hereinafter, referred to as Atalla I.

The instant method provides a novel post-treatment of these nanoporous celluloses with an eye to scale up to plant operation wherein recycling and recovery of reagents is crucial in the efficient and cost-effective operation of a full-scale plant. The instant method includes diminishing the alkali (e.g., sodium hydroxide) content of the post-treatment solution by converting it to a salt (e.g., a sodium salt). This is suitably accomplished by adding a neutralizing agent to reduce the pH of the solution sufficiently so that the alkali, e.g., sodium hydroxide, can no longer catalyze the conversion to cellulose II and the nano-porosity of the cellulose under treatment is preserved. The neutralizing acid is suitably hydrochloric acid, acetic acid or carbonic acid formed by dissolution of carbon dioxide into the post-treatment solution. The neutralized post-treatment solution also contains extracted phytochemicals which can be recovered from the solution.

Embodiments of the instant method additionally include recovering and recycling the alkai and alcohol used in the treatment process, and recovering phytochemicals from the neutralized post-treatment solution. Embodiments of the novel method also contemplate treating agricultural residues, such as stovers of forage crops that are used as animal feed, to improve the digestibility of the residues, especially for ruminant animals, and provide a more nutritious animal feed. Embodiments of the invention can performed at commercial scale of production, producing commercial scale quantities of treated cellulosic material, i.e., nanoporous cellulosic material.

Thus, in the present application, a novel method is provided for preventing the conversion to cellulose II, requiring the use of much less ethanol and less wash water. It also provides other advantages in specific contexts.

BRIEF DESCRIPTION OF THE DRAWING

The invention may be better understood and appreciated by reference to the detailed description of specific embodiments presented herein in conjunction with the accompanying drawings of which:

FIG. 2 is a HPLC chromatogram of phytochemicals recovered from the neutralized post-treatment solution.

DETAILED DESCRIPTION

Figure 1:
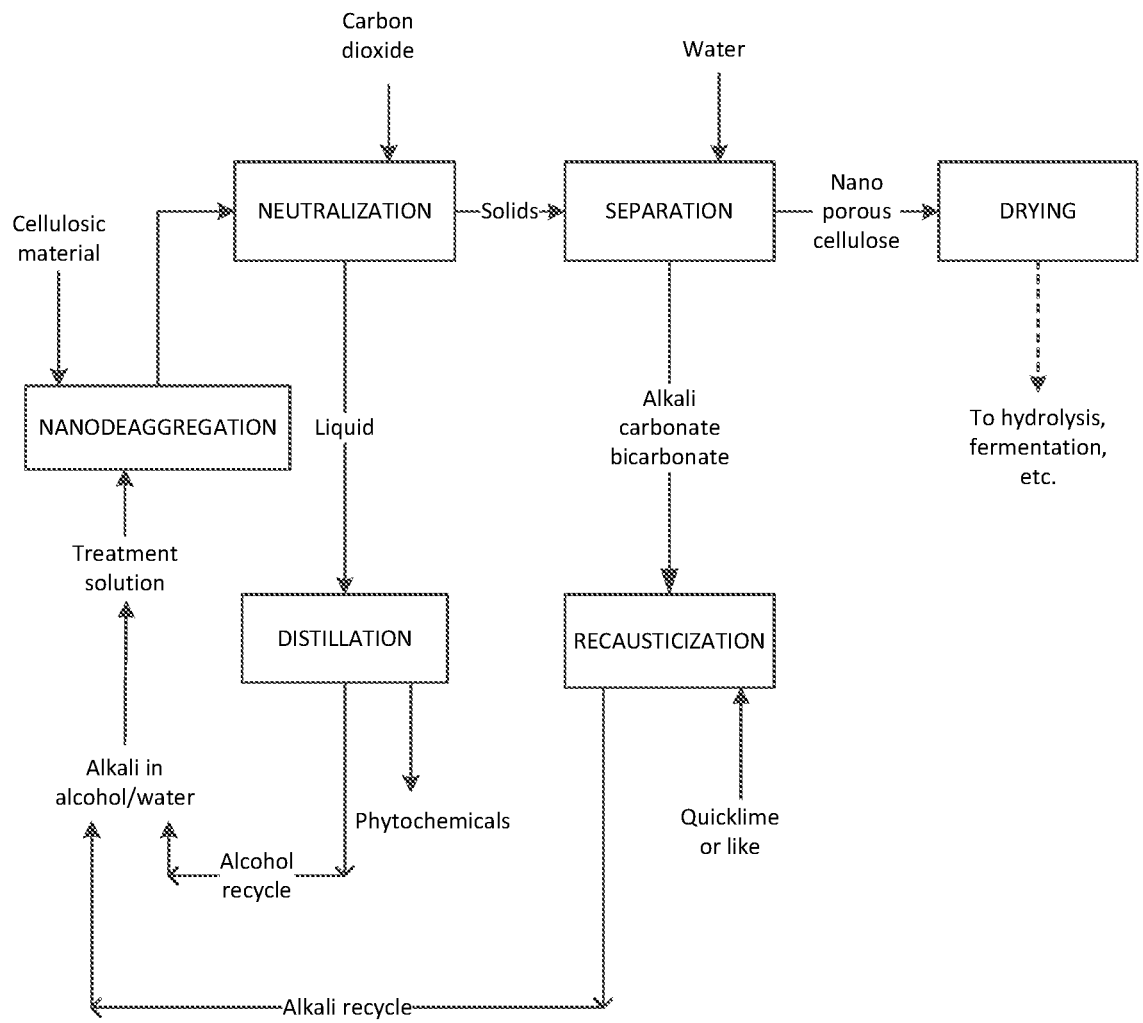
FIG. 1 is a flowchart illustrating the various steps of the deaggregation process of cellulosic material with the advantageous recycling of reagents.

The application provides a method for producing nanoporous cellulose. The method advantageously can be suitably scaled up for commercial scale production. The method includes deaggregating a cellulosic material by treating with material with a solution of an alkali and a co-solvent. The method includes diminishing the alkali, e.g., sodium hydroxide, concentration after treatment by converting the alkali to an alkali salt. This is suitably accomplished by a novel post-treatment, i.e., adding a neutralizing acid, e.g., carbonic acid as carbon dioxide, to reduce the pH of the solution sufficiently so that the alkali, e.g., sodium hydroxide, can no longer catalyze the conversion the treated cellulosic material to cellulose II and the nanoporosity of the cellulose under treatment is preserved.

Before any embodiments of the invention are explained in detail, however, it is to be understood that the invention is not limited in its application to the details of construction and the arrangement of components set forth in the following description, illustrated in the following drawings or exemplified by the Examples. Such description, drawings, and Examples are not intended to limit the scope of the invention as set forth in the appended claims. The invention is capable of other embodiments and of being practiced or of being carried out in various ways.

Further, no admission is made that any reference, including any patent or patent document, cited in this specification constitutes prior art. In particular, it will be understood that, unless otherwise stated, reference to any document herein does not constitute an admission that any of these documents form part of the common general knowledge in the prior art in the United States or in any other country. Any discussion of the references states what their authors assert, and the applicant reserves the right to challenge the accuracy and pertinence of any of the documents cited herein.

Throughout this disclosure, various aspects of this invention may be presented in a range format. It should be understood that the description in range format is merely for convenience and brevity, and should not be construed as an inflexible limitation on the scope of the invention. Accordingly, as will be understood by one skilled in the art, for any and all purposes, particularly in terms of providing a written description, all ranges disclosed herein also encompass any and all possible subranges and combinations of subranges thereof, as well as all integral and fractional numerical values within that range. As only one example, a range of 20% to 40% can be broken down into ranges of 20% to 32.5% and 32.5% to 40%, 20% to 27.5% and 27.5% to 40%, etc. Any listed range is also easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. Further, as will also be understood by one skilled in the art, all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio. Further, the phrases "ranging/ranges between" a first indicate number and a second indicate number and "ranging/ranges from" a first indicate number to a second indicate number are used herein interchangeably. The foregoing are only examples of what is specifically intended.

Also, it is to be understood that the phraseology and terminology used herein is for the purpose of description and should not be regarded as limiting. The use of "comprising," "including," "having," and variations thereof herein is meant to encompass the items listed thereafter and equivalents thereof as well as additional items. "Comprising" encompasses the terms "consisting of" and "consisting essentially of." The use of "consisting essentially of" means that the composition or method may include additional ingredients and/or steps, but only if the additional ingredients and/or steps do not materially alter the basic and novel characteristics of the claimed composition or method. Unless specified or limited otherwise, the terms such as "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise noted, technical terms are used according to conventional usage. However, as used herein, the following definitions may be useful in aiding the skilled practitioner in understanding the invention:

As used herein, the terms "cellulosic material", "cellulosic feedstock", or "cellulosic substrate" are meant to refer to any type of biomass, substance or product that contains cellulose. Cellulosic materials may include biomass in the form of grasses such as switch grass, cord grass, rye grass, *miscanthus*, or a combination thereof; sugar-processing residues such as sugar cane bagasse and sugar beet pulp; agricultural residues or wastes such as stovers of forage crops, e.g., soybean stover, corn stover, sorghum stover, as well as oat straw, rice straw, rice hulls, barley straw, corn cobs, wheat straw, canola straw, oat hulls, and corn fiber; or any combination thereof. Cellulosic material may also include one or more species of fiber that originate from different cellulosic feedstocks. Wheat straw, barley straw, corn stover, soybean stover, canola straw, switch grass, reed canary grass, sugar cane bagasse, cord grass, oat hulls, sugar beet pulp and *miscanthus* are particularly advantageous as cellulosic materials due to their widespread availability and low cost.

The term "degree of polymerization" (abbreviated as D.P.) refers to the number of D-glucose monomers in a cellulose molecule. Thus, the term "average degree of polymerization", or "average D.P.", refers to the average number of anhyroglucose molecules per cellulose polymer in a population of cellulose polymers.

As used herein, the terms "treatment," "treating," "pretreatment," or "pretreating" in respect of cellulose are meant to refer to a process or treatment in accordance with embodiments of the invention in which cellulose is made more accessible for enzymatic or chemical, e.g., chemical catalytic, reaction.

"Treatment solution" in reference to treating cellulosic materials is meant to refer to a solution of an alkali in a co-solvent, typically water and a polar miscible solvent, e.g., sodium hydroxide in ethanol/water co-solvent. "Post-treatment solution" is meant to refer to the treatment solution after reaction with the cellulosic material.

"Modification or degradation" in reference to cellulose is used to refer to the biological, e.g., enzymatic, or chemical-induced alteration of the native structure of cellulose. Such changes and alterations are known to those in the art and include those involved in enzymatic degradation and/or enzymatic or chemical hydrolysis of cellulose, as well as chemical modifications involved in a variety of commercial cellulose-based products, production of alcohols by fermentation of biomass, and generation of hydrogen-rich biofuels.

The term "stable" or "stabilizing" in regard to decrystallized cellulose refers to decrystallized cellulose that does not change materially over a selected period of time and under selected conditions.

In view of the many disadvantages inherent in conventional treatments to unlock cellulose to make it more reactive, embodiments of the invention include novel methods for deaggregating cellulose to form nanoporous celluloses, stabilizing the nanoporous celluloses and recycling of reagents. The methods include reacting a cellulosic material with a treatment solution, which includes an alkali dissolved in a co-solvent, under ambient conditions of temperature and pressure that may be optimized for economic feasibility. Subjecting the cellulosic material to such treatment in accordance with embodiments of the invention makes the cellulose more accessible for enzymatic or chemical reaction, by opening up the tightly aggregated domains, which are also the source of recalcitrance during hydrolysis. The resulting nanoporous cellulose in accordance with embodiments of the invention also allows for much more uniform substitution along the cellulose chains, thus minimizing problems of quality control currently inherent in producing many cellulose derivative products. The instand method is suitably a commercial scale production for producing commercial scale amounts of treated cellulosic material, i.e., nanoporous cellulosic material.

As described above, the treatment solution in accordance with embodiments of the invention includes an alkali dissolved in a co-solvent. Suitably, the alkali is dissolved in a co-solvent comprising water plus a second water-miscible solvent. In one aspect, the second solvent is suitably an alcohol which may include, e.g., methanol, ethanol, propanol, isopropanol, butanol, isobutanol, or a polyol. In another aspect, the second solvent may include other protic solvents as well as aprotic solvents that are miscible in water. In an illustrated embodiment, the co-solvent is ethanol and water.

In some embodiments of the invention, the alkali is suitably sodium hydroxide (NaOH), although other alkaline agents, such as other alkali metal hydroxides, may be used, such as lithium hydroxide (LiOH) or potassium hydroxide (KOH). The concentration of, e.g., NaOH, needed in the treatment solution depends on the nature of the cellulose to be treated, as different celluloses may have their lattice forms disrupted at different concentrations of alkali. For example, the threshold for mercerization of most pulps is approximately 8% NaOH in water; for cotton, it is about 11 to 12%, depending on prior pretreatment; and for bacterial cellulose, it is about 14%. The alkali concentration in the treatment solution is suitably greater than 1 M, suitably can range from about 1 M to about 2 M.

These novel celluloses can also be aptly referred to as "highly disordered cellulose", as "nanoporous cellulose" or as "laterally expanded cellulose". Whether previously referred to as "highly disordered cellulose" or as "nanoporous cellulose", the novel celluloses described in these applications are neither amorphous, nor mercerized nor completely disordered. For convenience, these novel celluloses are hereinafter referred to either as "nano-deaggregated" or "nanoporous" celluloses, as, for purposes of this application, these terms better describe the most significant differences between these fibers and previously known forms of cellulose.

In this application, a novel post-treatment is provided after the initial exposure of cellulosic materials to the NaOH solution in the co-solvent system in inventor's previously described system, i.e., Atalla I. The present post-treatment is optimal in certain special contexts wherein the possibility of sodium hydroxide catalyzing the conversion to cellulose II or the mercerized form of cellulose is prevented by a procedure other than the process described in Atalla I.

In Atalla I, the prevention of conversion to cellulose II is accomplished through washing the alkali, e.g., sodium hydroxide, out of the treated cellulose with the co-solvent. This reduces the concentration of sodium hydroxide sufficiently so that when the cellulose is eventually washed with water, the concentration of NaOH is not sufficient to catalyze the conversion to cellulose II, which represents re-aggregation into a different polymorph of cellulose that lacks the nano-porosity that is the object of the instant process. In other words, the post-treatment for removal of sufficient sodium hydroxide avoids mercerization or conversion to cellulose II upon exposure to water.

While the post-treatment procedure described in Atalla I is effective in preventing conversion to cellulose II, it requires the use of at least twice the amount of co-solvent used in the initial step of exposure. Alternative post treatment procedures that would require use of less co-solvent are suitably desirable and that may provide additional advantages in specific contexts, and with an eye to efficient and cost-effective scale up of the process.

In accordance with embodiments of the present invention, neutralization of the alkali in the post-treatment solution is provided. A number of different acids may suitably be used for this purpose. One is hydrochloric acid, which effectively converts significant amounts of, e.g., sodium hydroxide to sodium chloride.

Another aspect of the present invention that is advantageous to scale-up of the formation of nanoporous celluloses is the recauticization of the formed metal salt, e.g., sodium chloride, to the metal hydroxide, e.g., sodium hydroxide, so that the metal hydroxide may be re-used. While use of hydrochloric acid in the post-treatment is effective, recausticizing the sodium chloride to sodium hydroxide to be reused in the process is complex and requires high energy.

For certain applications that are more readily scaled to larger capacity for commercial use, the use of carbonic acid through dissolution and reaction of carbon dioxide is provided for neutralization. Carbon dioxide, when bubbled into the co-solvent system containing sodium hydroxide, leads to reaction with the sodium hydroxide to form first sodium carbonate, which will precipitate out of the co-solvent system at a nominal pH of 10, because sodium carbonate is not soluble in ethanol, the dominant component of the co-solvent. If appropriate, bubbling carbon dioxide can be continued until the sodium carbonate is converted to sodium bicarbonate, which also is insoluble in ethanol, at a nominal pH of 8. Thus, carbon dioxide may be suitably used to neutralize the sodium hydroxide after the first process step wherein the cellulosic materials are treated with sodium hydroxide in the ethanol-water co-solvent. After neutralization of the sodium hydroxide, the nanoporous celluloses are quite stable in water.

In some embodiments, such as the process depicted in FIG. 1, the process begins with cellulosic material which may be biomass such as corn stover or a similar lignocellulosic material. In a first step of the process, the cellulosic material is treated with a treatment solution of an alkali, such as sodium hydroxide, in a co-solvent of water and an alcohol, such as ethanol. It is at this treatment step that the cellulose in the cellulosic material becomes nano-deaggregated as discussed above. This step is suitably carried out at ambient temperature and pressure. Also formed in the process and present in post-treatment solution/neutralized post-treatment solution are phytochemicals such as hydroxycinnamic acids, other phenolic lignin fragments and lignans.

The treatment solution contains alkalizing compounds, e.g., NaOH, KOH, LiOH, or combinations thereof. The alkali concentration is suitably greater than 1 M, suitably can range from about 1 to about 2.0 M, in the co-solvent of water and water-miscible solvent, e.g., an alcohol such as ethanol. After reaction with the cellulosic material, the treatment solution becomes a post-treatment solution.

A second step suitably includes neutralization of the post-treatment solution with carbon dioxide. Such neutralization precipitates the alkali as a carbonate/bicarbonate, e.g., sodium carbonate/bicarbonate, as discussed above.

A third step suitably includes separating the treated cellulosic material and precipitated alkali salts from the neutralized post-treatment solution. This is suitably accomplished by filtration or centrifugation.

A fourth step suitably includes separating the treated cellulosic material from the precipitant alkali salt(s) which may be accomplished with the addition of water to dissolve the salt(s).

A fifth step suitably includes optionally drying the treated cellulosic material which may be optionally hydrolyzed via enzymatic reaction or chemically reacted to form other cellulose-derived products.

A sixth step suitably includes recovering the alkali via recausticization treatment, for example, with quicklime, hydrated lime or slaked lime, and recycling the recovered alkali to form treatment solution.

A seventh step suitably includes distilling the neutralized post-treatment solution to recover the alcohol and recycling the alcohol to form treatment solution.

An eighth step suitably includes recovering from the distillation bottoms of step seven, phytochemicals that have been solubilized in the treatment solution step. Such phytochemicals suitably include hydroxy-cinnamic acids and other phenolic lignin fragments as well as some lignans.

Embodiments of the invention may also be described as a system for treating cellulosic material. The system includes a treatment stage, a post-treatment stage and a recycling/recovery stage. The treatment stage includes reacting a cellulosic material with a treatment solution of sodium hydroxide in an ethanol/water co-solvent to produce a treated cellulosic material in a post-treatment solution. The post-treatment stage includes treating the post-treatment solution with carbon dioxide to neutralize the alkali and precipitate an alkali salt. The recycling/recovery stage includes (i) separating the treated cellulosic material and precipitated salt from the neutralized post-treatment solution, (ii) separating the alkali salt from the treated cellulosic material, (iii) recovering the alkali by recausitizing the alkali salt to yield recovered alkali, and (iv) recovering the ethanol from the neutralized post-treatment solution.

The recycling/recovery stage of the system further includes recovering the phytochemicals from the neutralized post-treatment solution.

Thus, the instant process and system includes not only the formation of nanoporous celluloses, but the recovery of alkali and alcohol as well as production of phytochemicals. Such phytochemicals may be suitably purified and recovered as specific individual products.

A particular context for use of the method and system of the present invention is currently contemplated though others in the arena of cellulose utilization are possible. It is contemplated that the treatment of agricultural residues such as corn stover, sugar cane bagasse, wheat straw and residues from other crops according to methods and the system of the invention is of particular value to transform them into easily digested feeds for ruminant animals.

Feeds from Agricultural Residues:

When agricultural residues are treated with an alkali in a co-solvent of water and a polar solvent, which is fully miscible in water, e.g., an alcohol such as ethanol, the cellulosic structure is opened up and made nanoporous. Simultaneously some lignin related compounds that can inhibit the action of digestive enzymes of ruminant animals are extracted. When the sodium hydroxide is converted to sodium carbonate or sodium bicarbonate, some polysaccharides that are of lower degrees of polymerization, and are solubilized in the first step, are re-deposited on the fibers of the residue thus increasing the yield compared to Atalla I that can be used as feed. The phytochemicals extracted in the process remain in solution and can be separated after the neutralized post-treatment solution is separated from the fibers and the precipitated sodium carbonate and/or sodium bicarbonate. These phytochemicals can then be recovered as they can have value if isolated in appropriate forms.

In the application to agricultural residues to convert them into nutritious feeds for ruminant animals, the process to make the residues nanoporous begins with treatment with the solution of sodium hydroxide in the co-solvent. At the next step, carbon dioxide is suitably bubbled into the post-treatment solution to neutralize the NaOH and precipitate the sodium carbonate and/or sodium bicarbonate.

The next step involves the separation of the treated residues and precipitated sodium carbonate and/or sodium bicarbonate from the neutralized post-treatment solution. This is suitably done by any one of the many processes available for separating solids from liquids, including filtration or centrifugation.

The residues are then washed with water to dissolve the sodium carbonate and/or sodium bicarbonate. The converted residues can then be separated from the solution of sodium carbonate and/or bicarbonate by one of the traditional methods used for washing cellulosic biomass, such as screen filtration or screw pressing.

The sodium carbonate and/or sodium bicarbonate can then be re-causticized to sodium hydroxide by treatment with quicklime, hydrated lime or slaked lime. It can then be recycled to prepare the solution of sodium hydroxide in the co-solvent to be reused in step 1 of the overall process.

The neutralized post-treatment solution separated from the converted residues and precipitated sodium carbonate and/or sodium bicarbonate can be taken into a distillation column to recover the ethanol. The bottoms from this distillation will contain many of the substances separated from the agricultural residues that have remained soluble in the neutralized solution. These soluble substances will include a variety of phytochemicals that can be separated and can be of commercial value.

Among the phytochemicals are the hydroxy-cinnamic acids and other phenolic lignin fragments as well as some lignans. These can be separated, recovered and refined and have a number of uses.

The cellulosic material may suitably be the stover of a forage crop, suitably the stover is corn stover. When an agricultural residue, such as a stover, is the cellulosic material and is treated according to the methods of the invention, the resulting treated residue is an animal feed with increased digestibility compared to untreated residue as shown in the Examples below.

Example 1

The example presented is based on treatment of corn stover to convert it to nutritious feed for ruminant animals The corn stover is treated to produce feed by two different protocols, the one outlined above and, for comparison, the one used in the process described in Atalla I. This will show that the alternative process results in increased yield in the form of a nutritious feed.

Corn Stover for Feed

All of the samples prepared for this study were from a lot of corn stover harvested from the same field. The samples were supplied by the Agricultural Utilization Research Institute, in Wauseca, Minn., (AURI). Prior to shipment to Cellulose Sciences International (CSI—inventor's company), the stover was ground at AURI using a ½ inch screen, and bagged. The moisture content of the stover was determined by microwave balance to be 7.6%.

This example compares two protocols for treating biomass with a solution of 1.5 M NaOH dissolved in a co-solvent mixture of 75% ethanol and 25% water.

In order to assess the effect of the second protocol on yield, 6 samples were weighed out, with moisture-adjusted weights of 1.000 to 1.004 g. Two were treated according to a first protocol, and four were treated according to a second protocol.

The first protocol is as follows: The samples are placed in 50 ml centrifuge tubes and filled with the solution of alkali metal hydroxide (in this case NaOH), and agitated for 5 minutes in a laboratory shaker. Afterward, the samples are centrifuged and decanted. The tubes are then refilled with co-solvent mixture and agitated for another 5 minutes, centrifuged and decanted again. This is repeated such that the remaining solids are washed three times with co-solvent, and then washed with water until the pH is below around 8.5. The residual solids from each sample are decanted onto tared fiberglass filter pads and dried in a microwave balance to determine the yield of each sample.

The two samples treated according to this first protocol had a dried nano-deaggregated product of an average yield of 73.58% with a standard deviation of 1.06%.

The second protocol is as follows: The samples are placed in 50 ml centrifuge tubes and filled with the mixture of alkali metal hydroxide (in this case NaOH), and agitated for 5 minutes in a laboratory shaker. A nozzle and pH probe, are then inserted into each tube, and carbon dioxide bubbled through the fluid until the pH is reduced to around 8. The tubes are then recapped, centrifuged and decanted. They are then filled with water and agitated (washed) for 5 minutes, centrifuged and washed two more times with water for 5 minutes each wash. The residual solids from each sample are decanted onto tared fiberglass filter pads and dried in a microwave balance to determine the yield of each sample.

The four samples treated according to the second protocol had a dried nano-deaggregated product of an average yield of 85.87% with a standard deviation of 2.22%.

The results demonstrate the advantageous use of the second protocol in accordance with the present invention.

Example 2

Digestibility of Corn Stover and Phytochemical Extraction

This example demonstrates two key additional benefits of treatment of corn stover by the process outlined above. The first is the enhanced digestibility of the treated corn stover relative to the untreated stover. The second is the extraction of valuable phytochemicals during the process.

The treatment protocol for the corn stover was similar to the second protocol in EXAMPLE 1 with respect to the solution used, except that the first stage of treatment was for 60 minutes rather than 5 minutes. In this example, 50 g ODW of corn stover was placed in a stirred reactor, along with 950 ml of treatment solution (75% ethanol, 25% water co-solvent mixture, with 57 g sodium hydroxide dissolved in the mixture). After agitating for an hour, carbon dioxide was sparged through the mixture until the pH was around 9. The mixture was then filtered by means of a Buchner funnel and vacuum flask assembly. The post-filtration solids were washed to remove precipitated sodium carbonate and the any residual treatment solution, and dried for digestibility analysis. Furthermore, the filtrate was retained for recovery of the phytochemicals extracted from the corn stover.

Digestibility

The digestibility studies were carried out at the University of Wisconsin Department of Dairy Science. Samples prepared as described below were inserted into the rumen of cannulated cows in order to monitor the rates of digestion.

Samples of both treated and untreated corn stover were ground to 2 mm through a Wiley mill. Samples were then weighed into Ankom F57 fiber filter bags, with each sample being duplicated for each time point for each of the two cannulated cows used for this assay. Bags were placed in the rumen of each cow for time periods of 0, 12, 24, 30, 36, 42, 48, 96, 120, and 240 hours, with bags placed in reverse order. Bags were all removed at the same time and placed in ice prior to being rinsed in a clothes washer with cold water for two 12-minute rinse cycles. After rinsing, bags were placed into a forced-air oven for 48 hours at 60° C. and then analyzed for Neutral Detergent Fiber (NDF) using the Ankom 200 Fiber Analyzer (ANKOM Technology, Macedon, N.Y.) as well as sodium sulfite and alpha amylase (Ferreira and Mertens, 2007).

The samples were then rinsed with acetone twice for five minutes, air dried in a hood for a few hours, and placed in a forced-air oven for 48 hours at 60° C. Samples were then weighed and NDF residues calculated. In addition, the rates of digestion were calculated.

Neutral Detergent Fiber (NDF) is the most common measure of fiber used for animal feed analysis. NDF measures most of the structural components in plant cells, that is, lignin, hemicelluloses, and cellulose, but not pectins, proteins, sugars or lipids.

The most comprehensive measure of digestibility that is relevant in ruminant nutrition has been defined as the Total Tract Neutral Detergent Fiber Digestibility or TTNDFD. It combines parameters related to rates of digestion with parameters relating to dwell time of the fiber in the digestive tract of the animal. The data generated from the experiments described above were used to calculate the TTNDFD for the corn stover samples treated by the protocol described above, and samples of the untreated corn stover. The results are shown in Table 1

TABLE 1

Comparison of Digestibility of Treated and Untreated Stover

|  | Untreated Stover in Situ | Treated Stover in Situ |
|---|---|---|
| Digestible NDF | 69.3 | 90.0 |
| Fiber digestion (%/hr) | 2 | 6.2 |
| TTNDFD | 33.0 | 69.9 |

The results reported in Table 1 reveal that all of the relevant parameters for the treated, nanoporous stover were increased. The rate of digestion was tripled, while the TTNDFD was more than doubled.

Phytochemicals

The liquid phase separated after the neutralization was treated to recover the phytochemicals solubilized during the treatment. The first step was to evaporate the ethanol component of the cosolvent. The phytochemicals remained in solution in the remaining aqueous component. The aqueous component was then freeze dried. The phytochemicals recovered were approximately 6% to 7% of the dry weight of the original corn stover.

Analyses of the phytochemicals suggests that they consist of two major components. The first is oligosaccharide residues very likely from the hemicelluloses that are an integral part of plant cell wall structure. The second is a number of hydroxycinnamic acids and their oligomers.

The hydroxycinnamic acids and their oligomers are thought to have a dual role in the plant. They form crosslinks between the polysaccharides thus reinforcing the strength of the cell wall. They also are inhibitors of the action of the digestive enzymes of ruminant animals as part of the evolutionary adaptation of grasses against predation by herbivores.

In addition, however, the hydroxycinnamic acids and their oligomers are potent antioxidants that can inhibit the action of oxidative enzymes used by plant pathogens to break down the structures of the plants. Reference is made to FIG. 2 wherein an analysis of the phytochemical extract by HPLC is shown. Detection is via UV absorption so only the hydroxycinnamic acids and their oligomers appear.

All of the peaks at elution times less than 20 minutes are associated with hydroxycinnamic acids in their monomeric form, while those eluting after 25 minutes are aligomeric form. On the basis of past studies of the oligomeric forms it is anticipated that the dimeric forms are primarily dimers of ferulic acid. It is noted that in the elution interval between 23 minutes and 40 minutes a broad peak is found with multiple small peaks superimposed. These are likely the multiple dimeric and oligomeric forms known to result from free radical coupling reactions during maturation of the cell wall. There is superimposed a single strong peak at 29.6 minutes. It appears more likely that this represents a dimeric form of ferulic acid that includes a stilbene substructure that is likely formed within the cell rather than as the result of free radical coupling reactions. Such structures are known to be particularly effective antioxidants that can protect the plant against the oxidative enzymes used by pathogens to attack cell wall structures in the plant.

In summary, the embodiments of the invention presented in the application provide a method suitable for a scale-up production of nanoporous cellulosic materials with advantageous recovery and recycling of reagents. Embodiments also provide a method of producing an enhanced digestibility plant-based or cellulose-based animal feed, prepared by treating the animal feed according to the methods of the invention. Further, embodiments of the invention provide phytochemical extracted from cellulosic materials according to methods of the invention.

All publications, patents and patent applications referenced in this specification are indicative of the level of ordinary skill in the art to which this application pertains. All publications, patents and patent applications are herein expressly incorporated by reference to the same extent as if each individual publication or patent application was specifically and individually indicated by reference. In case of conflict between the present disclosure and the incorporated patents, publications and references, the present disclosure should control.

The invention claimed is:

1. A method of treating and stabilizing a lignocellulosic material, comprising, in the order set forth, a) first contacting a lignocellulosic material with a treatment solution of an alkali in an alcohol/water co-solvent to yield a combination of (i) a nano-deaggregated lignocellulose and (ii) a post-treatment solution which contains dissolved phytochemicals, and then b) second treating the combination of nano-deaggregated lignocellulose and the post-treatment solution with an acid to convert the alkali into as an alkali salt and reduce pH to yield a stabilized nano-deaggregated lignocellulose and a neutralized post-treatment solution, the pH being reduced to a level such that the stabilized nano-deaggregated lignocellulose not mercerized upon exposure to water.

2. The method of claim 1, wherein the cellulosic material is a plant-based animal feed.

3. The method of claim 2, wherein the animal feed is the stover of a forage crop.

4. The method of claim 2, wherein the treated plant-based animal feed has improved digestibility.

5. A method of treating a plant-based animal feed to improve digestibility of the feed comprising treating an animal feed according to the method of claim 1.

6. A method of treating and stabilizing a cellulosic material, comprising, a) first contacting a cellulosic material with a treatment solution of an alkali in an alcohol/water co-solvent to yield (i) a nano-deaggregated cellulose and (ii) a post-treatment solution which contains dissolved phytochemicals, and then b) second treating the nano-deaggregated cellulose and the post-treatment solution with an acid to convert the alkali into an alkali salt and reduce pH to yield a stabilized nano-deaggregated cellulose and a neutralized post-treatment solution, the pH being reduced to a level such that the stabilized nano-deaggregated cellulose is not mercerized upon exposure to water, wherein the pH of the post-treatment solution is reduced to a pH in the range of 7-11.

7. The method of claim 6, wherein the acid is carbonic acid formed by dissolving/reacting carbon dioxide ($CO_2$) in/with post-treatment solution.

8. The method of claim 6, furthering comprising recovering the phytochemicals from the neutralized post-treatment solution.

9. The method of claim 6, wherein the cellulosic material includes corn stover, wheat straw, soybean stover, sugar cane bagasse, corn cobs, rice straw, rice hulls, corn fiber, barley straw, canola straw, oat straw, oat hulls, tree barks and foliage, and stover of a forage crop and combinations thereof.

10. The method of claim 6, wherein the alkali is an alkali metal hydroxide and the alkali salt is an alkali metal salt.

11. The method of claim 6, wherein the alkali is sodium hydroxide, the acid is carbonic acid and the alkali salt is sodium carbonate/sodium bicarbonate.

12. The method of claim 11, wherein the sodium carbonate/bicarbonate is recausticized by treatment with quicklime, hydrated lime or slaked lime.

13. The method of claim 6, wherein the phytochemicals include hydroxycinnamic acids, phenolic lignin fragments and lignans.

14. The method of claim 6, further comprising separating the nano-deaggregated cellulose and alkali salt from the neutralized post-treatment solution.

15. The method of claim 14, further comprising recovering the alkali from the alkali salt and recycling the alkali to form a treatment solution.

16. The method of claim 14, further comprising distilling the neutralized post-treatment solution to recover the alcohol, and recycling the recovered alcohol to form treatment solution.

17. A method for processing a cellulosic material to yield a stabilized nano-deaggregated cellulose, comprising the steps of: (i) treating a cellulosic material with a treatment solution of sodium hydroxide in an ethanol/water co-solvent to produce a nano-deaggregated cellulose and a post-treatment solution having dissolved phytochemicals; (ii) adjusting the pH by dissolving carbon dioxide in the post-treatment solution to produce a neutralized post-treatment solution having a pH between about 7 and about 11, a stabilized nano-deaggregated cellulose, and a precipitated sodium carbonate/bicarbonate; (iii) separating the stabilized nano-deaggregated cellulose and the precipitated sodium carbonate/bicarbonate from the neutralized post-treatment solution; (iv) separating the stabilized nano-deaggregated cellulose from the precipitated sodium carbonate/bicarbonate; (v) recausticizing the sodium carbonate/bicarbonate to yield recovered sodium hydroxide; and (vi) recovering the ethanol from the neutralized post-treatment solution.

18. The method of claim 17, further comprising recycling the recovered sodium hydroxide to form the treatment solution.

19. The method of claim 17, further comprising recycling the recovered ethanol to form the treatment solution.

20. The method of claim 17, further comprising recovering of the phytochemicals from the neutralized post-treatment solution.

21. A method of preparing a stabilized nano-deaggregated lignocellulose, comprising
   a) contacting a lignocellulosic material with a treatment solution of an alkali in an alcohol/water co-solvent to yield (i) a nano-deaggregated lignocellulose and (ii) a post-treatment solution which contains dissolved phytochemicals, and then
   b) treating the (i) nano-deaggregated lignocellulose and the (ii) post-treatment solution from step (a) with acid to neutralize the alkali and yield a stabilized nano-deaggregated lignocellulose and a neutralized post-treatment solution, wherein the pH of the neutralized post-treatment solution is reduced to a pH in the range of 7-11, and
   c) recovering the phytochemicals from the neutralized post-treatment solution.

22. A method of producing stabilized nano-deaggregated lignocellulosic material and phytochemicals, comprising:
   contacting a lignocellulosic material with alkali in an alcohol/water co-solvent to yield a product which is a nano-deaggregated lignocellulosic material and co-solvent containing phytochemicals, and
   stabilizing the nano-deaggregated lignocellulosic material by treating the product with an acid to reduce the pH to about 8.

23. The method of claim 22, further comprising, recovering the phytochemicals from the co-solvent.

* * * * *